United States Patent [19]
Yamada et al.

[11] Patent Number: 4,971,171
[45] Date of Patent: Nov. 20, 1990

[54] ENGINE COOLING SYSTEM FOR FOUR-WHEEL ALL-TERRAIN VEHICLE

[75] Inventors: Kozo Yamada, Saitama; Shoji Okumura, Tochigi, both of Japan

[73] Assignee: Honda Giken Kogyo Kabushiki Kaisha, Tokyo, Japan

[21] Appl. No.: 324,222

[22] Filed: Mar. 15, 1989

[30] Foreign Application Priority Data

Mar. 17, 1988 [JP] Japan ............................. 63-35535[U]
Mar. 17, 1988 [JP] Japan ............................. 63-35536[U]

[51] Int. Cl.⁵ .......................................... B60K 11/06
[52] U.S. Cl. ................... 180/68.1; 123/41.33; 180/68.4
[58] Field of Search ........... 180/68.1, 68.4, 68.5, 180/229; 123/41.33

[56] References Cited

U.S. PATENT DOCUMENTS

| | | | |
|---|---|---|---|
| 4,237,996 | 12/1980 | Matruda et al. | 180/229 |
| 4,535,866 | 8/1985 | Shiga | 180/215 |
| 4,537,273 | 8/1985 | Funabashi | 180/229 |
| 4,640,341 | 2/1987 | Ozawa | 165/41 |
| 4,673,032 | 6/1987 | Hara et al. | 165/44 |
| 4,757,872 | 7/1988 | Inomata | 180/69.4 X |
| 4,770,262 | 9/1988 | Yasunaga et al. | 180/68.1 |
| 4,799,569 | 1/1989 | Hattori et al. | 180/68.1 X |

FOREIGN PATENT DOCUMENTS 61-891121 5/1986 Japan .
61-155612 7/1986 Japan .
61-180888 11/1986 Japan .

Primary Examiner—Charles A. Marmor
Assistant Examiner—Michael Mar
Attorney, Agent, or Firm—Rosen, Dainow & Jacobs

[57] ABSTRACT

A four-wheel all-terrain vehicle including an engine cooling system for cooling an engine mounted centrally on a frame. The engine cooling system is mounted to the frame and has a cooling fan positioned contiguously and forwardly of the engine and an oil cooler positioned contiguously and forwardly of the lower half section of the cooling fan. The frame has a head pipe inclined rearwardly, and an axis about which the cooling fan is rotated extends at right angles to the axis of the head pipe. The upper half section of the cooling fan is located to face a cylinder head of the engine to cool the same.

7 Claims, 3 Drawing Sheets

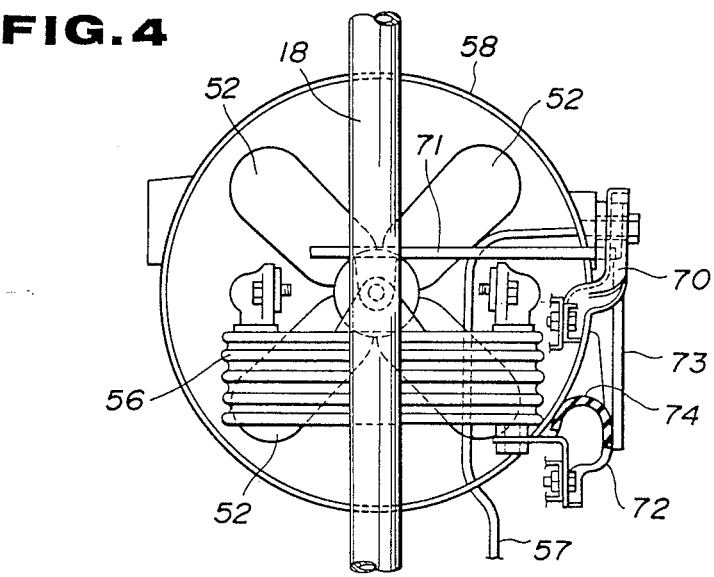
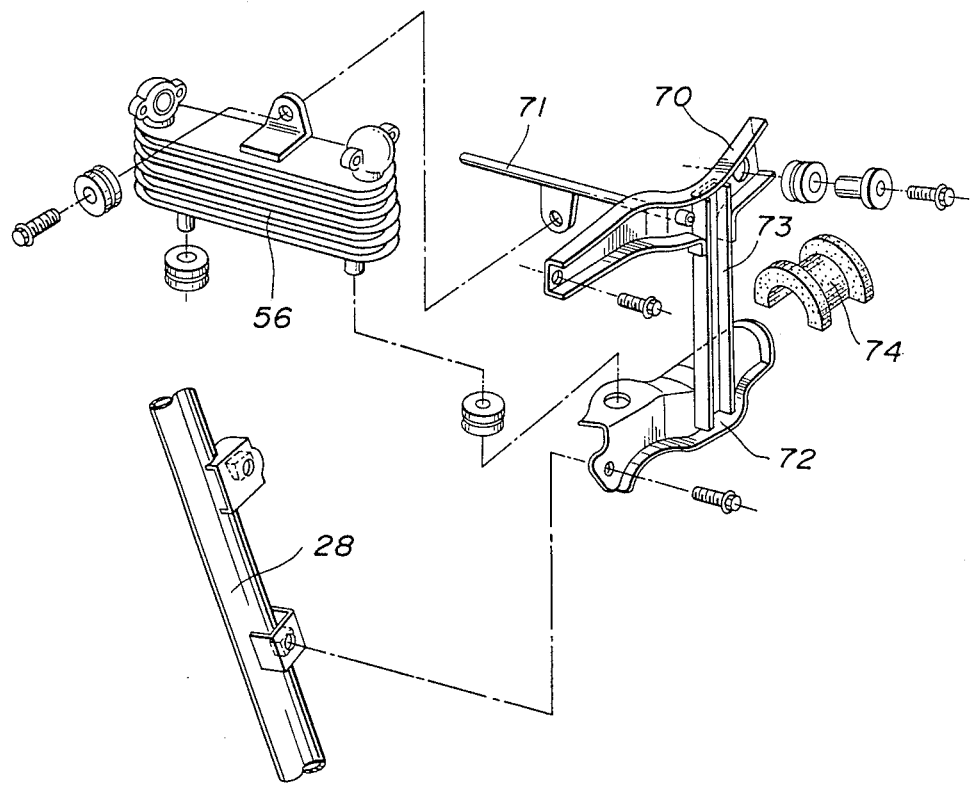

ENGINE COOLING SYSTEM FOR FOUR-WHEEL ALL-TERRAIN VEHICLE

BACKGROUND OF THE INVENTION

1. Field of the Invention

The present invention relates generally to engine cooling systems for a four-wheel all-terrain vehicle and more particularly, to an improved arrangement for supplying cooling air to an engine.

2. Description of the Related Art

Conventional four-wheel all-terrain vehicles, called "buggy" in the trade, normally include cooling fans for cooling engines, for example, as shown in Japanese patent laid-open publications No. 61-89121 and No. 61-155612.

Japanese utility model laid-open publication No. 61-180888 discloses an engine cooling system including an oil cooler or radiator in addition to a conventional cooling fan. Specifically, an engine is mounted centrally on a vehicle frame. Attached to the frame forwardly of the engine is a coolilng fan, the upper half section of which being arranged to face a cylinder head which requires cooling more than any other components of the engine. An oil cooler is provided on the leading end of the frame in an effort to receive as much cooling air as possible. This oil cooler is positioned contiguously and forwardly of that upper half section of the cooling fan. Thus, after air passes through the oil cooler, its temperature may be increased, and effective cooling of the cylinder head is not achieved.

SUMMARY OF THE INVENTION

It is, therefore, a primary object of this invention to provide an engine cooling system for a four-wheel all-terrain vehicle, which is capable of effectively cooling an engine, particularly, a cylinder head of the engine.

It is another object of the invention to provide an engine cooling system for a four-wheel all-terrain vehicle, which provides compact arrangement of the vehicle as well as concentration of vehicular weight on the center of the vehicle.

In accordance with one aspect of the invention, there is provided a four-wheel all-terrain vehicle which comprises a frame, a pair of right and left front wheels supported by the frame and operatively connected to a steering shaft, a pair of right and left rear wheels supported by the frame, an engine mounted substantially centrally on the frame and having a cylinder head at its upper portion, and a cooling system for cooling the engine, said cooling system including a cooling fan mounted to the frame and driven by drive means, said cooling fan being positioned contiguously and forwardly of the engine, and a radiator mounted to the frame and coupled to the engine, said radiator being positioned contiguously and forwardly of the lower half section of the cooling fan.

In a preferred mode, the frame includes a head pipe inclined rearwardly and adapted to rotatably support the steering shaft, and the engine cooling system is positioned between the head pipe and the engine. An axis about which the cooling fan is rotated extends at right angles to the axis of the head pipe. In this fashion, the overall cooling fan assembly is held in parallel to the head pipe. This allows the engine to be mounted more forwardly than any other positions, thereby bringing the vehicle into a compact arrangement and providing concentration of the weight on the center of the vehicle.

The radiator is an oil cooler positioned in front of the lower half of the cooling fan, not the upper half thereof. Cooling air can thus be directed directly to the cylinder head without passing through the radiator so as to effectively cool the cylinder head.

In accordance with another aspect of this invention, there is provided an engine cooling system for a four-wheel all-terrain vehicle including a frame and an engine substantially centrally mounted on the frame and having a cylinder head at its upper portion, said engine cooling system comprising a cooling fan mounted to the frame and driven by drive means, said cooling fan being positioned contiguously and forwardly of the engine, and a radiator mounted to the frame and coupled to the engine, said radiator being positioned contiguously and forwardly of the lower half section of the cooling fan.

The drive means is an electric motor, and the cooling fan and the motor are both enclosed in a shroud which is, in turn, fixedly attached to the frame. This shroud protects the motor from heat radiated from the engine.

BRIEF DESCRIPTION OF THE DRAWINGS

A better understanding of the invention may be had by reference to the following description when taken in conjunction with the accompanying drawings, in which:

FIG. 4 is a front view of the engine cooling system as shown in FIG. 3; and

FIG. 5 is a view showing the manner in which an oil cooler is mounted to the frame.

DESCRIPTION OF THE PREFERRED EMBODIMENTS

Figure 1:
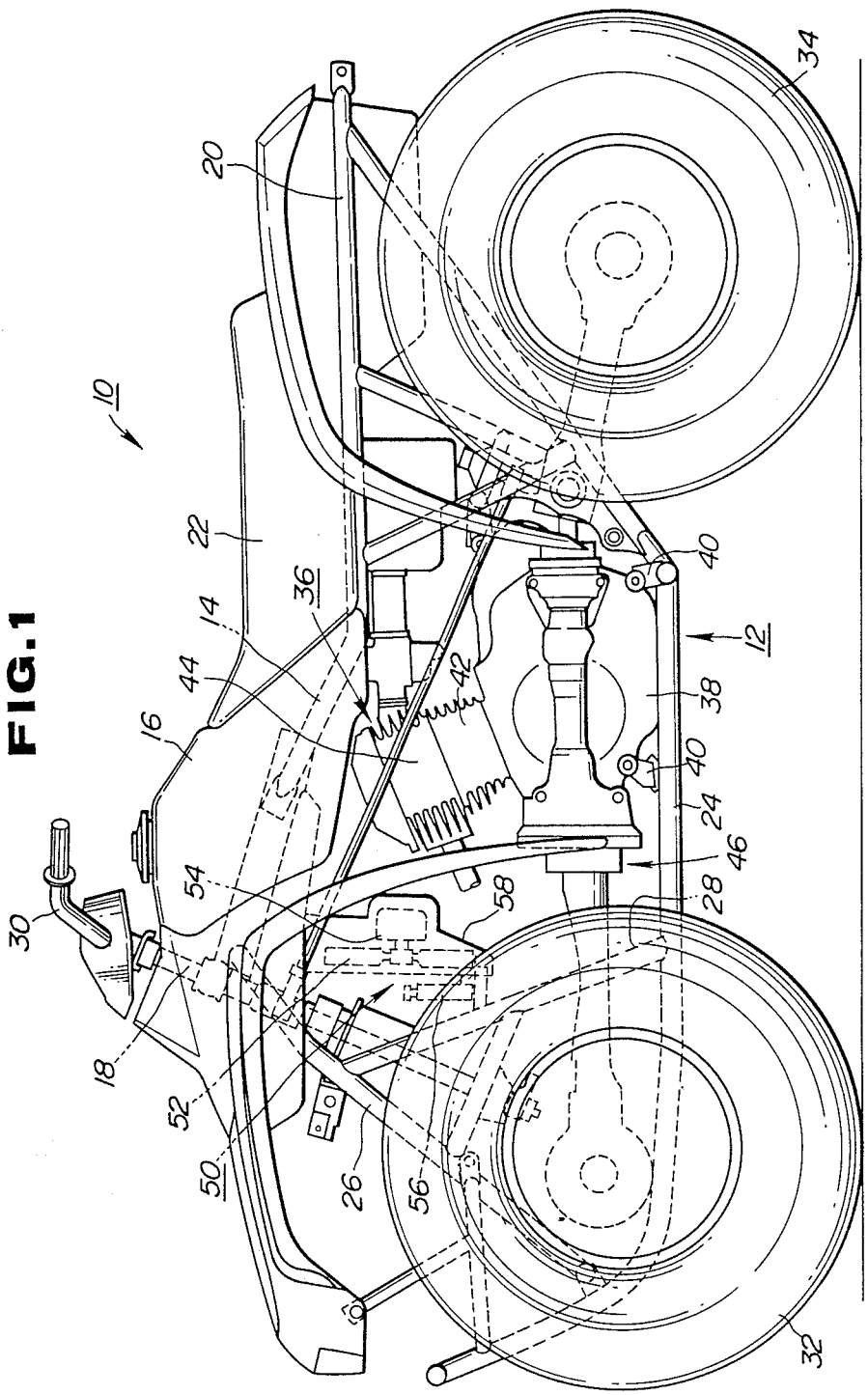
FIG. 1 is a schematic side view of a four-wheel all-terrain vehicle with an engine cooling system constructed according to the teachings of the invention.

With now reference to FIG. 1, there is shown a four-wheel all-terrain vehicle or "buggy" generally indicated by reference numeral 10 and including a frame 12 in the form of a pipe. Specifically, the frame 12 has a pair of right and left main pipes 14 extending longitudinally at the upper portion of the frame 12. A fuel tank 16 is situated on these main pipes 14. Coupled to the forward ends of the main pipes 14 is a head pipe 18 inclined rearwardly and adapted to rotatably support a steering shaft (not shown) therewithin. The rearward ends of the main pipes 14 are coupled to the forward ends of a pair of right and left seat pipes 20 on which a driver's seat 22 is seated. At the lower portion of the frame 12, a pair of right and left lower pipes 24 extend longitudinally of the frame 12. The rearward ends of the lower pipes 24 are coupled to the rearward ends of the seat pipes 20. A pair of right and left front pipes 26 extend from the forward ends of the main pipes 14 to the forward ends of the lower pipes 24. Also, a pair of right and left down pipes 28 extend rearwardly and downwardly from the upper ends of the front pipes 26 and terminate at the lower pipes 24.

The steering shaft has an upper end fixedly coupled to a steering handle 30 in the form of a rod and a lower end operatively connected to a pair of right and left front wheels 32 through a suitable steering mechanism (not shown). A pair of right and left rear wheels 34 are suspended from the frame 12 by means of a suitable suspension mechanism (not shown).

An engine 36 is, for example, a single-cylinder four cycle internal combustion engine and has a crankcase 38 mounted substantially centrally to the lower pipes 24 through a plurality of brackets 40. Mounted on the upper surface of the crankcase 38 through a suitable gasket (not shown) is a cylinder block 42 on which a cylinder head 44 is mounted through a suitable gasket (not shown). A crankshaft (not shown) rotates in the crankcase 38 and act as an output shaft. The power of the output shaft is transmitted to the front wheels 32 and the rear wheels 34 through a suitable transmission system generally indicated by reference numeral 46.

Figure 2:
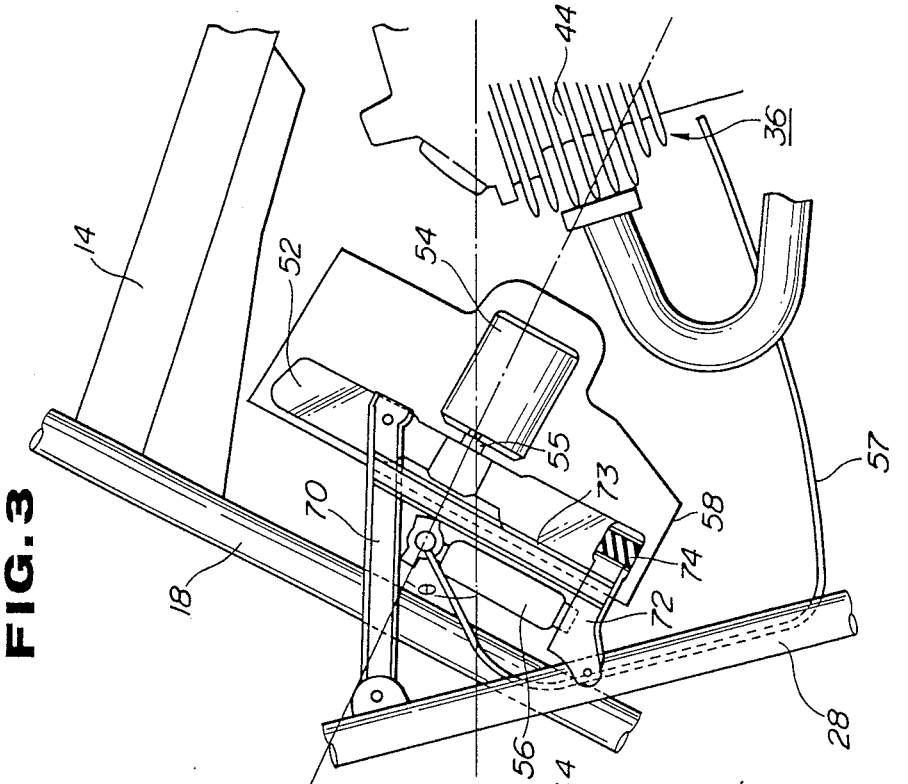
FIG. 2 is an enlarged view of the engine cooling system as shown in FIG. 1.

As best seen in FIG. 2, an engine cooling system 50 includes a cooling fan 52 driven by an electric motor 574 and an oil cooler or heat exchanger 56 coupled to the engine 36 through pipes 57. The cooling fan 52 and motor 54 are both enclosed in a shroud 58. The shroud 58 is of a cylindrical shape and has an upper portion attached to the main pipes 14 through brackets 60 and a lower portion attached to the down pipes 28 through a pair of stays 62. The oil cooler 56 is bolted to the stays 62 and is positioned contiguously and forwardly of the lower half section of the cooling fan 52. In the illustrated embodiment, an output shaft 55 of the electric motor 54 extends in a horizontal direction. The upper half section of the cooling fan 52 is arranged to face the cylinder head 44 of the engine 36. With this arrangement, after cooling air passes through the uper half section of the cooling fan 52, it is directed directly to the cylinder head 44 which requires cooling more than any other components of the engine 56.

Figure 3:
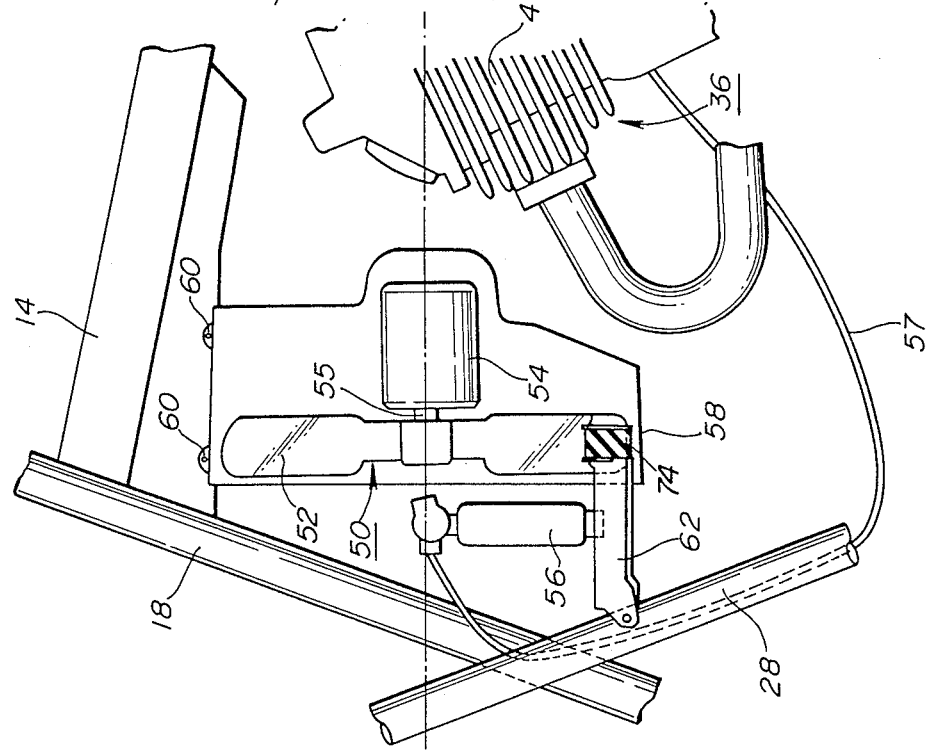
FIG. 3 is a view similar to FIG. 2, but showing another embodiment of the invention.

Another embodiment of the invention is shown in FIGS. 3 to 5 wherein like reference numerals indicate like or similar parts. As shown in FIG. 3, the shroud 58 is attached to the down pipes 28 through a pair of upper stays 70 and a pair of lower stays 72 connected to the upper stays 70 by means of vertical members 73. More specifically, each upper stay 70 has a forward end bolted to the down pipe 28 and a rearward end bolted to one side of the shroud 58. Each lower stay 72, shorter than the upper stay, has a forward end bolted to the down pipe. Straddled over the lower stays 72 are rubber elements 74 by which opposite sides of the shroud 58 are supported. In the illustrated embodiment, the output shaft 55 of the electric motor 54 or an axis about which the cooling fan 52 is rotated extends at right angles to the axis of the head pipe 18. The oil cooler 56 is also inclined at the same angle as the cooling fan 50, or is held parallel to the head pipe 18. As shown in FIGS. 4 and 5, the oil cooler 56 has a lower portion attached to the pair of lower stays 72, and an upper portion attached to a cross member 71 by which the pair of the upper stays 70 are interconnected. Since the cooling system is located in an inclined fashion as shown, the engine 36 can be moved further forward. This allows compact arrangement of the vehicle and concentration of the vehicular weight at the center of the vehicle. Also, the lower end of the cooling system is higher than the previous embodiment whereby attachment of mud to the system are effectively prevented.

Although various forms and variations have been suggested, it will be appreciated that the invention is not limited thereto, but encompasses all modifications and configurations within the scope of the appended claims.

What is claimed is:

1. A four-wheel all-terrain vehicle comprising:
a frame;
front and rear wheels supported by said frame;
an engine attached to said frame and having a cylinder head at an upper part thereof; and
a cooling system including a cooling fan attached to said frame and located forwardly and contiguously of said engine, and a radiator attached to said frame and located forwardly of said cooling fan;
said cooling fan including a first section and a second section said sections being divided by an axis of rotation of said cooling fan, said radiator being located contiguously of said first section of said cooling fan and below said axis,
said first section of said cooling fan facing a lower part of the engine so that a first flow of air through said radiator and said first section of the cooling fan is directed to said lower part of said engine, and said section of said cooling fan facing said upper part of the engine and disposed so that a second flow of air is directed to said upper part of the engine.

2. A four-wheel all terrain vehicle according to claim 1, wherein said frame includes a head pipe, said head pipe having an upper end inclined toward said engine, wherein said cooling system is located between said head pipe and said engine, and wherein said axis extends substantially at right angles to an axis of said head pipe.

3. A four-wheel all-terrain vehicle according to claim 2, wherein said radiator is an oil cooler inclined rearwardly at approximately the same angle as the head pipe.

4. A four-wheel all-terrain vehicle according to claim 1, further including drive means for driving said cooling fan and a shroud, said drive means comprising an electric motor and said shroud encasing said electric motor and said cooling fan therewithin.

5. A multi-wheel vehicle comprising:
a frame;
front and rear wheels attached to said frame;
an engine attached to said frame and having a cylinder head at an upper part thereof; and
a cooling system including a cooling fan attached to said frame and located forwardly and contiguously of said engine, and a radiator attached to said frame and located forwardly of said cooling fan;
said cooling fan including a first section and a second section said sections being divided by an axis of rotation of said cooling fan, said radiator being located contiguously of said first section of said cooling fan and below said axis,
said first section of said cooling fan facing a lower part of the engine so that a first flow of air through said radiator and said first section of the cooling fan is directed to said lower part of said engine, and said second section of said cooling fan facing said upper part of the engine and disposed so that a second flow of air is directed to said upper part of the engine.

6. A multi-wheel vehicle according to claim 5 wherein said frame includes a head pipe, said head pipe having an upper and inclined toward said engine, wherein said cooling system is located between said head pipe and said engine, and wherein said axis extends substantially at right angles to an axis of said head pipe.

7. A multi-wheel vehicle according to claim 5, further including drive means for driving said cooling fan and a shroud, said drive means comprising an electric motor and said shroud encasing said electric motor and said cooling fan therewithin.

* * * * *